Aug. 21, 1962     S. J. WORLEY     3,050,728
RADIO DIRECTION FINDING SYSTEM
Filed June 17, 1958     2 Sheets-Sheet 2
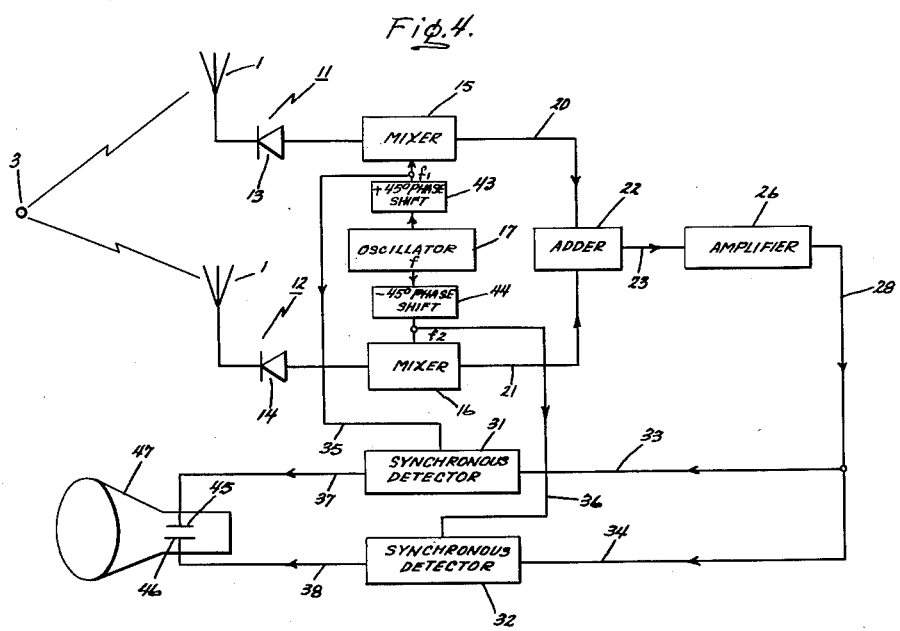
Inventor:
Sidney J. Worley,
by Gust & Irish
Attorneys.

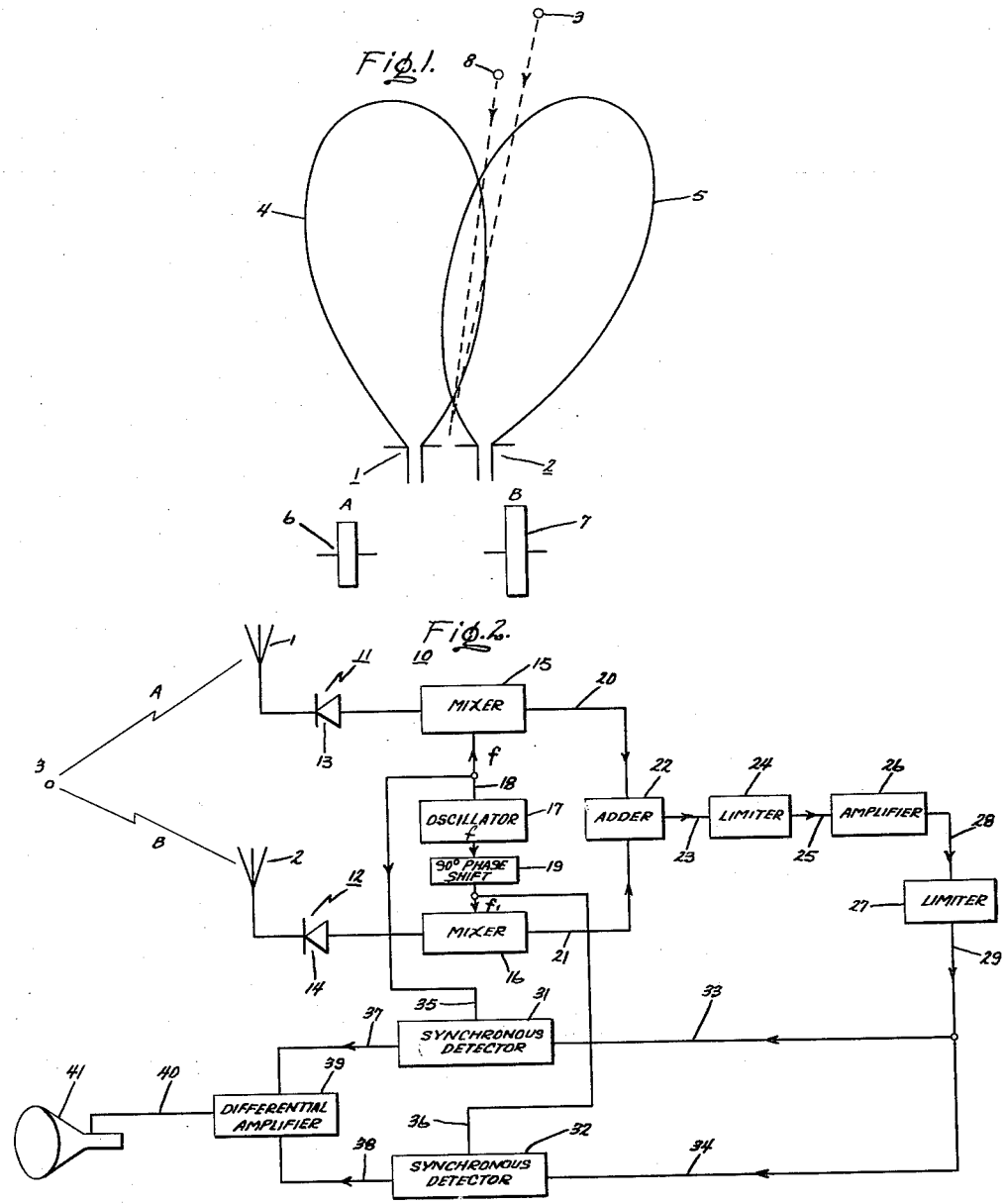

3,050,728
RADIO DIRECTION FINDING SYSTEM
Sidney J. Worley, Fort Wayne, Ind., assignor to International Telephone and Telegraph Corporation
Filed June 17, 1958, Ser. No. 744,035
3 Claims. (Cl. 343—119)

This invention relates to radio direction finding systems, and more particularly to a passive radio direction finding system providing directional information independent of the strength of the signals received from the distant source.

In certain passive radio direction finding systems employed in the location of a distant source of radio signals, it is desirable to provide a cathode ray tube deflection proportional to the angle which the direction to the signal source forms with a reference "forward" direction. This angle is found by comparing the signals received from the source in two antennas which look in different directions. It is further desirable that this angle be ascertained independently of the distance to the receiving apparatus from the signal source and thus the signal strength; it will be seen that a weak received signal from a distant source at a large angle may provide the same antenna difference output signal as a strong received signal from a closer source at a smaller angle. A signal giving directional information independent of power input has in certain prior systems, been obtained by performing electronically the mathematical operation $$\left(\frac{A-B}{A+B}\right)$$

where A is the signal output of one of the antennas and B is the signal output of the other antenna; in such prior systems, a ratio of the amplitude of the signals respectively received by the two antennas is provided, this ratio being proportional to the angle between the two received signals independent of the actual signal strength.

In the above described prior systems for obtaining a ratio of two received signals, two amplifiers were employed respectively for the A and B channels. The disadvantage of such a system, however, was the requirement that the two amplifiers track to within a fraction of a db over the dynamic range of the amplifiers in order to obtain accurate directional information, i.e., the amplifiers were required to have substantially identical response characteristics. This requirement is, however, difficult to obtain in practice, particularly where logarithmic amplifiers are employed, and it is therefore desirable to provide a radio direction finding system of the type here under discussion in which a single amplifier may be employed for both input signals.

In accordance with the broader aspects of my invention, therefore, I provide a passive radio direction finding system having two input circuits for respectively receiving a radio signal from a distant source and thereby providing two input signals in response thereto. One of these input signals is shifted in phase with respect to the other input signal and the two signals are then added and passed through a single amplifier. Means are then provided for separating the two signals which were simultaneously passed through the amplifier, the signal separating means including demodulator means arranged respectively to pass signals corresponding to the first and second input signals.

It is therefore an object of my invention to provide an improved radio direction finding system.

Another object of my invention is to provide an improved radio direction finding system in which two input signals from separate antennae are combined and passed through a common amplifier and subsequently separated into signals corresponding to the two input signals.

A further object of my invention is to provide an improved passive radio direction finding system in which one of two input signals from separate antennas is phase shifted with respect to the other signal, with both signals being passed through a single amplifier.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 diagrammatically illustrates two antennas, as employed in a passive radio direction finding system, with their respective response characteristic loops and having signals being received by the two antennas from remote signal sources;

FIG. 2 is a schematic illustration of one embodiment of my invention;

FIG. 3 is a vector diagram useful in explaining my invention; and

FIG. 4 is another schematic illustration showing a modified form of my invention.

Referring now to FIG. 1, there is shown two antennas 1 and 2 respectively arranged for receiving signals from a distant source 3 of radio signals, which may be relatively short spaced-apart radio frequency pulses. The two antennas 1 and 2 respectively have response loops 4 and 5 as shown and the signal pulses respectively received by the antennas 1 and 2 from the remote signal source 3 are designated here as A and B as shown. It will be readily understood that the antennas 1 and 2 are schematically shown and may in practice respectively be a pair of arrays, horns, etc. It will now be seen that the signal pulses A received by the antenna 1 from the distant source 3 will provide an output pulse 6 having a substantially smaller amplitude than the output pulse 7 provided by the antenna 2 responsive to the received signal pulses B. It would be thought that mere ascertainment of the respective amplitudes of the input pulses 6 and 7 would provide the requisite information for determining the angular direction of the distant signal source 3, however, inspection of FIG. 1 will readily indicate that a strong signal source 8 relatively close to the two antennas and almost straight ahead, will provide strong output signals from both antennas and therefore a strong difference signal, i.e., a signal responsive to the difference in the two signal strengths, whereas, the actual magnitude of the difference signal in the case of the remote signal source 3 may be the same as that in the case of the signal source 8. It will, however, be seen that for any given signal source, the ratio between the received signals A and B will remain constant regardless of the strength of the signal source and its distance from the antennas 1 and 2.

Referring now to FIG. 2, one embodiment of my improved passive radio direction finding system, generally identified as 10, includes the antennas 1 and 2 for respectively receiving radio signals A and B from a common distant source 3, antennas 1 and 2 being respectively connected to input circuits 11 and 12. In this embodiment, detectors 13 and 14, which may be of any conventional form, are respectively connected in the input circuits 11 and 12 as shown. Suitable mixer circuits 15 and 16 are provided having their signal input circuits respectively connected to the detectors 13 and 14, and having their carrier input circuits respectively connected to local oscillator 17. Mixer circuits 15 and 16 may be of any conventional form and are arranged to provide only the side band frequencies of their respective output signals; mixers 15 and 16 would both be arranged to provide an output only when signals were present. Conventional balanced modulators which suppress the carrier in their outputs with side band frequencies being obtainable are well suited for use as the mixers 15 and 16.

Local oscillator 17 which provides a fixed carrier frequency $f$ has its output circuit 18 directly connected to the mixer 15 so that the carrier $f$ is modulated by the signal A in input circuit 11. However, a 90° phase shift network 19 connects the output circuit of oscillator 17 to the carrier input circuit of mixer 16 so that the carrier frequency supplied to the mixer 16, referred to as $f_1$ is phase shifted by 90° with respect to the carrier frequency $f$ supplied to the mixer 15. It will now be seen that the carrier frequency $f_1$ is modulated by the signal input B in the input circuit 12 and that by virtue of the 90° phase displacement between the carrier frequencies $f$ and $f_1$, the frequencies of the resulting modulated signals in the output circuits 20 and 21 of mixers 15 and 16 will respectively be phase displaced by 90°.

A conventional adding circuit 22 is provided having its input circuits connected respectively to the output circuits 20 and 21 of the mixers 15 and 16 and having its output circuit 23 connected to the input circuit of a suitable limiter 24. Limiter 24 in turn has its output circuit 25 connected to the input circuit of a suitable amplifer 26 with another limiter 27 being connected to its output circuit 28. Since the adding circuit 22 merely adds the signals appearing in the output circuits 20 and 21 of the mixers 15 and 16, it will be seen that the resulting signal in the output circuit 29 of limiter 27 after passing through limiter 24, amplifier 26 and limiter 27 has two components, corresponding respectively to the input signals A and B, these components being phase displaced by 90°.

In order to separate the single signal passed through the amplifier 26 with its associated limiters 24 and 27, two demodulating circuits 31 and 32 are provided having their signal input circuits 33 and 34 respectively connected to the output circuit 29 of limiter 27. Demodulating circuits 31 and 32, which may be conventional synchronous detectors, respectively have their carrier input circuits 35 and 36 connected to receive the carrier frequencies $f$ and $f_1$ respectively; carrier input circuit 35 of synchronous detector 31 is thus directly connected to the output circuit 18 of oscillator 17 while carrier input circuit 36 of synchronous detector 32 is connected to the carrier input circuit of mixer 16 so that the carrier frequency impressed thereon is the frequency $f_1$ which is phase displaced by 90° from the carrier frequency $f$. The demodulating synchronous detectors 31 and 32 thus in their output circuits 37 and 38 provide signals respectively derived from the input circuits 11 and 12 with the phase displacement eliminated, i.e., the signals in output circuits 37 and 38 of synchronous detectors 31 and 32 are in phase with their amplitudes corresponding to the relative amplitudes of the input circuits A and B. The output circuits 37 and 38 of synchronous detectors 31 and 32 may then be connected to the input circuits of differential amplifier 39 which serves to differentially combine the signals in the output circuits 37 and 38 of synchronous detectors 31 and 32, and which has its output circuit 40 connected to the deflection means of cathode ray oscilloscope 41; differential amplifier 39 thus provides a signal proportional to the ratio of the input signals A and B.

Referring now briefly to FIG. 3, assuming that the antennas 1 and 2 receive signals A and B from distant signal source 3, the resulting detected and 90° phase displaced signals A′ and B′ are shown. It will be readily understood that when these signals are added in the adding circuit 22, a resulting signal C′ is fed to the amplifier-limiter circuit 24—26—27. It will now be readily seen that the angle $\theta$ defined by the combined signal C′ is proportional to the ratio between the signals A′ and B′ and thus, the phase of the signal passed through the amplifier circuit is proportional to the ratio of the input signals. Assuming now that the input signals A and B received by the antennas 1 and 2 are doubled in strength, the resulting detected and 90° phase displaced signals are shown in FIG. 3 as A″ and B″. It will now readily be seen that the resulting combined signal C″ passed through the amplifier circuit 24—26—27 again has a phase angle $\theta$ and thus that the phase of the combined signal which in turn is proportional to the ratio of the input signals does not change responsive to a change in signal strength.

It will be seen that the limiter 24 is provided to prevent overloading of the amplifier 26 and the second limiter 27 follows the amplifier 26 in order to prevent gain variation from affecting the deflection sensitivity. It will also be readily understood that the amplifier 26 must have a sufficient band-width to pass the side band frequencies from the mixers 15 and 16 without distortion.

Referring now to FIG. 4 in which like elements are indicated by like reference numerals, here, instead of phase shifting one of the carriers applied to the mixers 15 and 16 by 90°, the carriers supplied to the mixers 15 and 16 are each shifted by 45°, leading in one case and lagging in the other, thereby to provide a total 90° phase displacement. Thus, one output circuit of oscillator 17, which supplies a carrier frequency $f$, is connected by means of 45° leading phase shift network 43 to the carrier input circuit of mixer 15 while the other output circuit of oscillator 17 is connected by means of 45° lagging phase shift network 44 to the mixer 16. Thus, the carrier frequency $f_1$ fed to the mixer 15 leads oscillator 17 frequency $f$ by 45° while the carrier frequency $f_2$ fed to the mixer 16 lags the oscillator frequency $f$ by 45°, it will, however, be seen that the phase displacement between the two carrier frequencies $f_1$ and $f_2$ is still 90° and therefore that the detected and modulated signals in the output circuits 20 and 21 of the mixers 15 and 16 will still be phase displaced by 90°. In the embodiment of FIG. 4, the limiters 24 and 27 are eliminated so that the output circuit 23 of the adder 22 is directly connected to the input circuit of amplifier 26 which in turn has its output circuit 28 connected respectively to the input circuits 33 and 34 of the synchronous detectors 31 and 32. Here it will be seen that the carrier input circuit 35 of the synchronous detector 31 is connected to the output of the 45° leading phase shift network 43 while the carrier input circuit 36 of the synchronous detector 32 is connected to the output of the lagging 45° phase shift network 44. Also in FIG. 4, the output circuits 37 and 38 of the synchronous detectors 31 and 32 are shown as being connected directly to deflection plates 45 and 46 of cathode ray oscilloscope 47; it will be understood that the net deflection provided by the pair of deflection plates 45 and 46 is responsive to the difference in the two voltages impressed thereon and thus, this connection in essence provides the same differentiating action as that provided by the differential amplifier 39 of FIG. 2. The embodiment of FIG. 4 may be preferred since a 45° leading or lagging phase shift network is less expensive than a 90° phase shift network.

It will be readily understood that two identical circuits of the type shown in FIG. 2 or 4 may be provided with their input circuits respectively connected to four antennas to receive four input signals, two of the antennas being arranged in one plane and the other two being arranged in a plane at right angles thereto. The outputs of the two pairs of synchronous detectors may then be connected respectively to the vertical and horizontal deflection plates of the cathode ray oscilloscope thereby to provide quadrature information concerning the distant source of signals.

It will now be seen that I have provided an improved passive radio direction finding system of the type providing an output signal representing a ratio of the input signals thereby providing directional information independent of power input, one of the input signals having its phase shifted so that the signals can be added and passed through a single amplifier, the amplified signal then being separated into its two components which were respectively derived from the two input signals thereby eliminating the problems encountered in previous passive direction finding systems of this type with regard to non-uniform tracking of amplifiers in two or more channels.

While I have described above the principles of my invention in connection with specific apparatus, it is to be clearly understood that this description is made only by way of example and not as a limitation to the scope of my invention.

What is claimed is:

1. A passive radio direction finding system comprising: first and second input circuits adapted respectively to be connected to two antennas for respectively receiving a radio signal from a distant source; a first signal mixer having its signal input circuit coupled to said first input circuit; a second signal mixer having its signal input circuit coupled to said second input circuit; a local oscillator having its output circuit coupled to the carrier input circuits by said first and second signal mixers and including means for shifting the phase of the carrier supplied to said second signal mixer with respect to the phase of the carrier supplied to said first signal mixer; an adding circuit connected to the output circuits of said first and second signal mixers; an amplifier having its input circuit connected to the output circuit of said adding circuit; first and second synchronous detectors having their signal input circuits respectively connected to the output circuit of said amplifier and having their carrier input circuits connected respectively to said local oscillator to receive said phase shifted carriers; and a differential amplifier having two input circuits connected respectively to the output circuits of said first and second synchronous detectors and having its output circuit adapted to be connected to deflection means oscilloscope means.

2. A radio direction finding system comprising: first and second input circuits adapted respectively to be connected to two antennas for respectively receiving a radio signal from a distant source; a first signal mixer having its signal input circuit coupled to said first input circuit; a second signal mixer having its signal input circuit coupled to said second input circuits; a local oscillator having its output circuit directly connected to the carrier input circuit of said first signal mixer; 90° phase shift means connecting said local oscillator output circuit to the carrier input circuit of said second signal mixer; an adding circuit connected to the output circuits of said first and second signal mixers; an amplifier having its input circuit connected to the output circuit of said adding circuit; and first and second synchronous detectors having their signal input circuits respectively connected to the output circuit of said amplifier, said first synchronous detector having its carrier input circuit connected to said local oscillator output circuit, said second synchronous detector having its carrier input circuit connected to said 90° phase shift means.

3. A passive radio direction finding system comprising: first and second input circuits adapted respectively to be connected to two antennas for respectively receiving a radio signal from a distant source; a first signal mixer having its signal input circuit coupled to said first input circuit; a second signal mixer having its signal input circuit coupled to said second input circuit; a local oscillator; 45° lagging phase shift means coupling the output circuit of said local oscillator to the carrier input circuit of said first signal mixer; 45° leading phase shift means coupling the output circuit of said local oscillator to the carrier input circuit of said second signal mixer; an adding circuit connected to the output circuit of said first and second signal mixers; an amplifier having its input circuit connected to the output circuit of said adding circuit; and first and second synchronous detectors having their signal input circuits connected respectively to the output circuit of said amplifier, said first synchronous detector having its carrier input circuit connected to said 45° lagging phase shift means, said second synchronous detector having its carrier input circuit connected to said 45° leading phase shift means.

References Cited in the file of this patent

UNITED STATES PATENTS

| | | |
|---|---|---|
| 2,234,331 | Bond | Mar. 11, 1941 |
| 2,238,129 | Paul | Apr. 15, 1941 |